Jan. 20, 1942.  H. S. WHELLER  2,270,665
HEATING DEVICE
Filed June 2, 1938   2 Sheets-Sheet 1
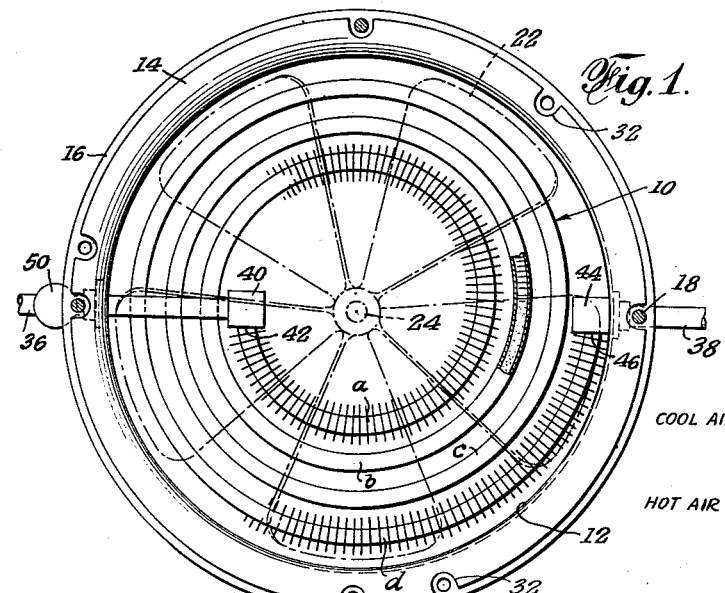
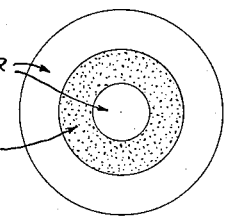
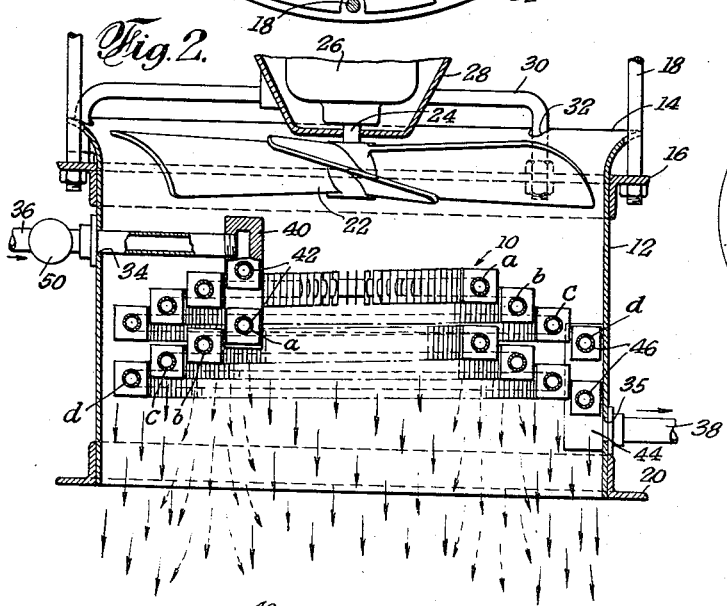
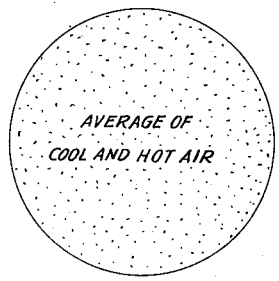
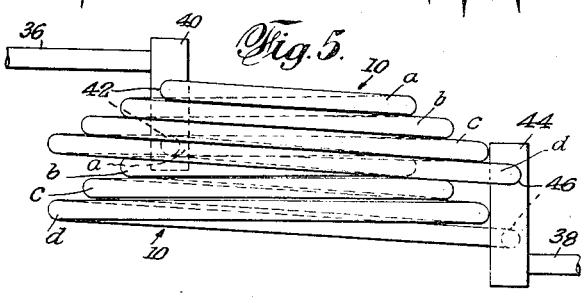
INVENTOR
HARRY STEWART WHELLER
BY
Irving F. Goodfriend
ATTORNEY Jan. 20, 1942.                H. S. WHELLER                2,270,665
                               HEATING DEVICE
                           Filed June 2, 1938            2 Sheets-Sheet 2
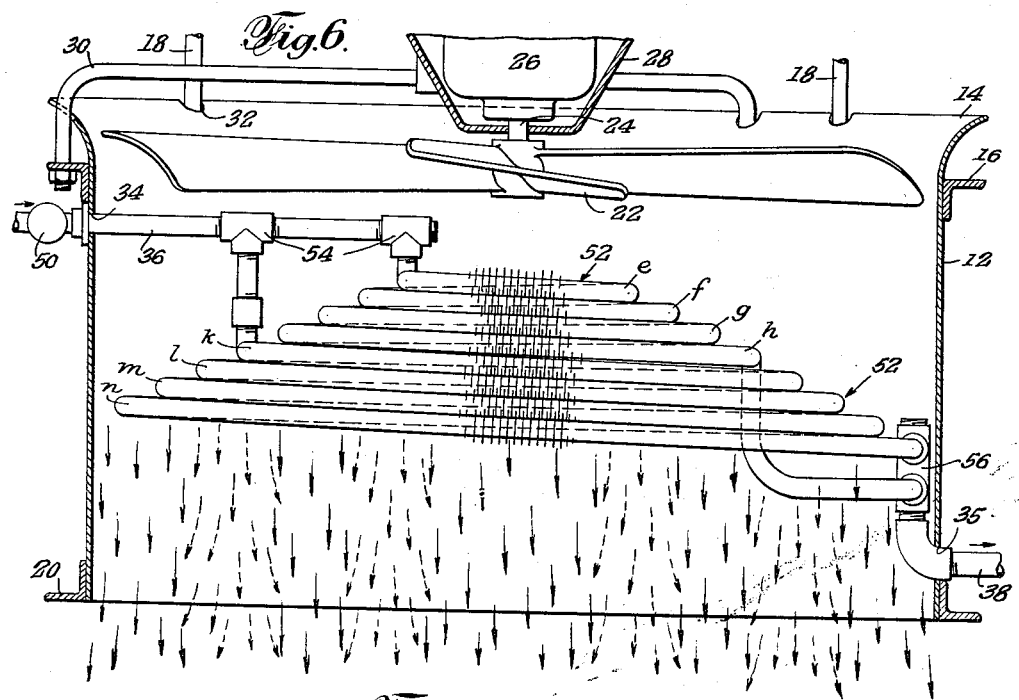
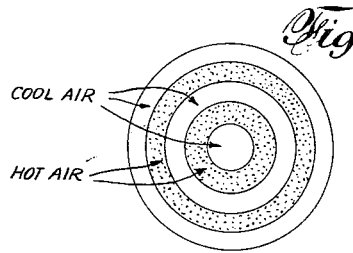
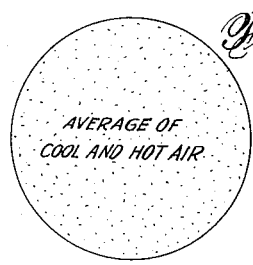
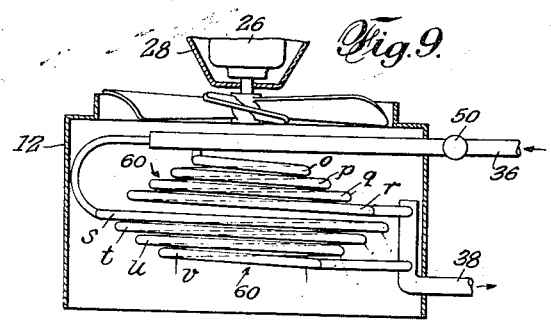
INVENTOR
HARRY STEWART WHELLER
BY
ATTORNEY Patented Jan. 20, 1942

2,270,665

UNITED STATES PATENT OFFICE 2,270,665

HEATING DEVICE

Harry Stewart Wheller, New York, N. Y., assignor to L. J. Wing Mfg. Co., New York, N. Y., a corporation of New York Application June 2, 1938, Serial No. 211,330

1 Claim. (Cl. 257—137)

The present invention relates to heating devices, generally known as "unit heaters," of the type in which air is circulated by a fan through the heater to thereby discharge a heated stream of air and more particularly to such a device in which the heating element is spiral in form and in which the temperature of the air discharged may be controlled, between defined limits, by the mixing of proportionately adjusted concentric columns of heated and unheated air comprising the discharged stream.

In my copending application, Serial No. 157,072, filed August 3, 1937, I have described a heating device wherein the temperature of the discharged air stream is controlled by adjusting the proportions of columns of heated and unheated air comprising the air stream by means of a plurality of coordinated dampers or vanes arranged adjacent heated and unheated sections of the device.

The present invention is directed to the provision of a heating device in which coordinated vanes or dampers and associated control mechanism may be eliminated, and in which concentric columns of heated and unheated air are discharged from the device in relative proportions determined by the throttling of the steam entering the heating element.

It is contemplated by the present invention therefore to provide heating devices wherein the relative magnitudes of the respective concentric columns of the heated and unheated air are directly controlled by throttling the steam in the heating element.

In the heaters of the prior art, which were of the tube and header type or serpentine design, the amount of heat, that is the temperature of the air discharged might also be varied by throttling the volume of steam supplied thereto. But it will be at once apparent, however, that in such heaters the throttling of the steam would create an air stream comprising a component of heated air alongside a component of unheated air. This would result in the discharge from such heaters of an air stream which was not completely and thoroughly mixed because the heated side of the air stream, since it is lighter, loses velocity much faster than the unheated side, and would diverge from the stream before it became thoroughly mixed with the unheated air at the other side. The air stream discharged from such prior art devices would therefore not be uniformly projected into the working area nor would the heated and unheated components be thoroughly mixed as they are projected into the working area.

The present invention, therefore, contemplates the provision of a heater of the character described in which the heated and unheated components of the air stream mix together and the entire heated air stream is uniformly projected into the working area. I accomplish this by completely enshrouding or enveloping the heated air column or columns within a shell or cylinder of unheated cooler air. By such arrangement, the warmer and lighter air is prevented from leaving the discharged air stream until it mixes with the adjacent encircling shell of cooler air and imparts thereto some of its heat.

For that purpose, the present invention contemplates the arrangement within the device of spiral tubular heater coils formed in expanding spirals with their rings disposed either in flat, conical or frusto-conical arrangement wherein the steam is fed to the inside (center) of the spiral, the condensate following the spiral outwardly to its larger diameter so that throttling of the steam pressure has the effect of reducing first the temperature of the outer lower or the larger rings of the spiral.

It will be understood that the air stream generated by the fan and passing over the rings of the heating coil will cool them, causing the steam passing therethrough to condense. When the pressure in the heating coil is sufficiently high, steam will pass through the entire coil without being completely condensed therein, thereby providing an effective heating surface throughout the entire extent of the heater spiral.

However, when the steam is throttled, in the conventional manner, the pressure velocity and quantity thereof within the heating coil is decreased and the steam will completely condense at some point in the coil, in advance of the condensate outlet, dependent upon the degree of throttling.

It will be apparent that only that portion of the coil containing live steam will then be sufficiently effective in heating the air stream as it passes over the coil, thereby restricting the heating surface area to the central portion of the spiral coil, and forming a uniform surrounding unheated portion.

By throttling the steam, therefore, the effective heating area of the coil may be adjusted so that only a portion of the air stream passing over the coil will be heated and the air stream will be discharged from the device in concentric columns in which the heated air is completely enshrouded by a cooler unheated air envelope.

By selectively throttling the steam, the effective heating area of the coil and, therefore, the relative proportions of heated and unheated air columns may be selectively adjusted to thereby control the temperature of the air stream.

Heating devices of the type concerned with in this application, heretofore found in the art, have not only failed to provide such novel results but have, in addition, been comparatively complex and costly in that they comprise a plurality of individual concentric tubes operatively connected to inlet and outlet steam headers requiring a comparatively large number of unions, couplings or other connections.

By providing a spiral coil, I eliminate the necessity of a number of separate individual tubes and attendant complexity, while at the same time providing a heater having a comparatively large available heating surface and delivering a readily controllable thoroughly mixed heated air stream of uniform temperature.

My invention, therefore, further contemplates the provision of a comparatively simple heater, easy to assemble and comprising relatively few members.

The method and principles of operation of the heating devices embodying the present invention and their numerous advantages will become more apparent from the accompanying drawings in which several practical embodiments of my invention are illustrated, and in which Fig. 1 is a top plan view of one embodiment of my invention;

Fig. 2 is a vertical sectional view through the same;

Fig. 3 is a diagrammatic view through the outlet of a device such as shown in Fig. 1 illustrating the arrangement of the heated and unheated air columns comprising the discharged air stream when the steam entering the spiral heating coil is partly throttled;

Fig. 4 is a similar view of the air stream at a point distant from the outlet.

Fig. 5 is an elevational view of the spiral heater coil of the device shown in Figs. 1 and 2.

Fig. 6 is an elevational view of a modified embodiment of the invention with the casing in section.

Fig. 7 is a diagrammatic view through the outlet of a device such as shown in Fig. 6 illustrating the arrangement of the heated and unheated air columns comprising the discharged air stream when the steam entering the spiral heating coil is partly throttled.

Fig. 8 is a similar view of the air stream at a point distant from the outlet.

Fig. 9 is an elevational view of another modified embodiment of the invention with the casing in section.

In that practical embodiment of my invention illustrated in Figures 1, 2 and 3, two spiral tube heaters or coils 10 are arranged in a casing 12. The number and the shape and size of the coils shown are for purposes of illustration only, as it will be readily understood that only one spiral coil is necessary to practice my invention and that any number above that may be used. The casing 12 may be of any conventional shape and material, being preferably cylindrical to conform to the usually circular outline of the heater coil. To facilitate the ingress of air with a minimum resistance to flow, the casing may be provided with a flared air inlet 14.

The casing may be reenforced adjacent its upper edge with an exteriorly arranged angle bar or ring 16, which may also serve to receive the bolts 18, for supporting the device in position, as on the ceiling, wall or floor of a room, in the usual manner.

Another similar reenforcing member 20 may be provided on the casing, at its lower edge, adjacent the discharge opening thereof which may also serve, if desired, for the arrangement on the casing of the revolving discharge outlet described in my United States Patent No. 2,000,112, or, if desired, a conventional stationary discharge outlet.

To circulate air to be heated through the casing, I provide, in the casing inlet, or, if desired, in the casing outlet, a power driven fan 22. Preferably, such fan may be directly mounted on the shaft 24 of a motor 26. The motor 26 is arranged in a crown member 28 whereby it is protected against damage that may result from exposure to heated air radiating from the heater. The motor may be supported on the casing by means of arms 30, which engage the crown member 28 by one end, and, passing through openings 32 in the flared edge of the casing, are bolted on the angle bar 16, or in any other manner well known in the art.

To connect the heating device in a steam heating system, the casing 12 may be provided at its upper end with the opening 34, through which a steam inlet pipe 36 may be introduced into the casing for connection to the heater coil or coils 10. Another opening 35 may be provided at the lower end of the casing to admit the condensate outlet pipe 38 thereinto for connection to the coil outlet.

I also prefer to have the said inlet and outlet pipe openings on diametrically opposed portions of the casings, whereby the steam inlet and condensate outlet pipes may best serve to support or to aid in supporting the casing of the heating device in suspended position.

The coil or coils 10 may be connected by their respective ends intermediate the steam inlet pipe 36 and condensate outlet pipe 38, in any desirable manner. One such manner of connection is illustrated and comprises a steam header 40 connected to the steam inlet pipe and provided with the suitable number of openings 42 at a point below the steam inlet pipe for receiving and supporting the narrowest, upper, inlet ends of the respective coils 10. Another condensate header 44 is coupled on the condensate outlet pipe and is similarly provided with the requisite number of openings 46, at a point above the condensate outlet pipe to receive and support the lowest, outlet ends of the heater coils 10.

It may here be stated that any number of spiral coils from one up may be provided in the heating devices of the present invention, according to the heating capacity desired, and that the use of two heater coils throughout the drawings is by way of illustration only.

It will be apparent that since any one spiral tube constitutes a complete heater, it will require only one coupling with each of the headers, thereby providing a relatively economical structure in comparison with prior circular heaters.

To regulate the pressure and volume of the steam entering the heaters, a throttle or control valve 50 is provided on the steam inlet pipe 36.

Within the limitation of having to be spiral, the heater coils 10 may otherwise be of any desired shape, size or outline. Preferably, however, in order to effectively present the heating surface to air circulated past the heater coils, the spirals may be arranged to have their rings close to one another in their axial direction and to be slightly spaced from one another in a radial direction, as clearly shown in Fig. 5.

In that embodiment of my invention illustrated in Figs. 1, 2 and 3, the heating device is shown with two heater coils 10, each having, by way of illustration only, four rings designated as $a$, $b$, $c$ and $d$, and conically arranged with the narrowest ring $a$ coupled to the steam header 40 and the widest ring $d$ coupled to the condensate return header 42.

It will be apparent that when, in the device of Figs. 1, 2 and 5, the throttle 50 is adjusted to turn the steam on, the steam will pass through the casing in parallel streams, each distributed through a spiral heater, and that the air circulated through the casing, on coming in contact with the steam containing tubes, will be heated by them.

It will also be apparent that the high velocity stream of cold, unheated air forced by the fan through the casing, over the spiral heaters, will cause the heaters to be relatively rapidly cooled, and that unless the steam passes through the heaters in sufficient volume it will be condensed and have its heating capacity substantially spent before it reaches the condensate header. As a consequence, only that portion of the heater in advance of the point of condensation containing live uncondensed steam will be effective for heating air and that part containing condensed, cooled liquid, will be relatively ineffective to heat the rapidly passing stream of air.

It will now also become apparent that by arranging the heater coils in an expanding preferably conical spiral, I am able, by regulating the pressure of the steam entering any spiral tube heater, to determine the magnitude of the central portion of the spiral that will contain live steam and be effective to heat the air passing thereover and consequently determine and regulate the relative magnitude of the portion of the stream of air forced through the casing which will be heated. Obviously, the other, outer part of the air stream passing through the casing over the outer part of the spiral will remain relatively unheated, thus providing two concentric air columns adjustable as to thickness and of different temperatures emerging from the heating device, as diagrammatically illustrated in Fig. 3 of the drawings.

It will be apparent that the heated air stream will be held "captive" within the enclosing shell of cooler air, so that, after a short travel, the heated air column will impart to the enshrouding shell of cooler air part of its heat to thereby obtain a substantially uniform temperature, higher than that of the cool air and lower than that of the heated air, across the entire stream a short distance beyond the heater discharge.

By way of a specific illustration, the throttle 50 may be adjusted to admit steam under such pressure that under a particular speed of the fan the steam will be condensed after it leaves the two narrowest, uppermost spirals $a$ and $b$ of each heater coil. It will be obvious that only the air passing immediately within and about spirals $a$ and $b$ will become heated and that the air passing about spirals $c$ and $d$ will form an enveloping concentric unheated column of air. Since only a relatively small portion of the air stream is heated, the final temperature of the air stream, after the heated and unheated air columns are mixed, will be relatively low.

Should it now be desired to increase the temperature of the air stream, it would only be necessary to adjust the throttle to increase the pressure of the steam entering the spiral tubes. Since the speed and volume of the air passing through the casing is constant, the effect of the increase in steam pressure would be to delay its condensation until after it has passed additional spirals of the heater, as may be desired, thereby increasing the proportion of the air column that is heated, with a consequent increase in the final temperature of the discharged mixed air stream.

In Figs. 6 and 9, I have illustrated heating devices wherein several adjustable alternate columns of heated and unheated air may be provided instead of the two single columns obtainable with the device of Figs. 1, 2 and 5.

Thus, in the device of Fig. 6, I arrange in the casing 12, in parallel, several spiral heater tubes 52, such as the two shown by way of illustration, each having its widest ring narrower than the narrowest ring of the next adjacent spiral tube heater so that all of the heaters are arranged in the shape of a cone, each individual heater coil forming a truncated portion of such cone.

Preferably, the inlet, narrower ends of each of the heater coils is connected directly to the steam inlet pipe 36, by means of couplings 54, the wider, outlet ends of the coils being coupled to a header 56, connected to the condensate outlet pipe 38, with the uppermost heater coil being coupled to the header 56, at a point below the header coupling of the lowermost coil.

It will be apparent that the steam may be throttled to be admitted at such reduced pressure so that it is cooled and condensed when it reaches coils $gh$ and $mn$ of the respective spiral tubes. The air passing over coils $ef$ and $kl$ will be heated and the air passing over coils $gh$ and $mn$ will remain unheated. The air stream passing through the casing will, therefore, consist of alternate concentric inner columns of heated and outer columns of unheated air, as is diagrammatically illustrated in Fig. 7. By this arrangement, a more complete and thorough mixing of the air columns in the discharged air stream may be obtained, in the same manner as when a single spiral heater is used.

The same result of alternate heated and unheated air columns may be obtained with the practical embodiment illustrated in Fig. 9, wherein two conical spiral heaters 60 are connected to the steam and condensate pipes 36 and 38, respectively, and disposed in mirrored arrangement, with corresponding portions of the heaters in contiguous position and the widest ring of the upper coil narrower than the widest ring of the lower coil. For purposes of illustration, the narrower rings $o$ and $v$, respectively, of the upper and lower spirals are shown oppositely directed and the widest rings $r$ and $s$, respectively, placed against one another.

It will be obvious that steam may be regulated to be admitted under reduced pressure into the heaters, so as to heat only the narrowest ring $o$ of the upper spiral and widest ring $s$ of the lower spiral, leaving the three wider rings of the upper spiral and the three narrower rings of the lower spiral unheated. Since heated ring $s$ is wider than unheated ring $r$, there will be provided two concentric heated air columns separated by an intervening concentric unheated air column, and that the magnitude of the respective columns of heated and unheated air may similarly be adjusted to regulate the average temperature of the air stream resulting from the mixing of the air columns. It will also be apparent that by increasing the number of heater coils a plurality of relatively thin, readily mixable, concentric, alternate, heated and unheated air columns may be provided in the air stream.

While the air stream passing the heater coils of the device of Fig. 9 has its outermost air column heated, it is further possible to provide thereabout an unheated air column by enlarging the casing diameter to space its walls from the widest coil $s$ to permit a layer of air to pass therebetween.

To further describe the operation of the heaters of the present invention, reference may be had to Figs. 3 and 4 and 7 and 8.

Fig. 3 illustrates relative arrangement of the component parts of the air stream as it emerges past the heating coils of a device such as is illustrated in Figs. 1, 2 and 5, and which consists of concentric, cylindrical unheated columns of air separated by a column of heated air. The central air column is unheated since it passes through the opening of coil ring $a$, where it does not come in contact with any heated surface. It will be understood that the magnitude of the central air column will depend upon the diameter of the ring, which should, for ordinary circumstances, be a minimum.

The air passing over and immediately about the steam containing coil rings $a$ and $b$ of the upper heater is heated thereby to form the hot air column.

Since only condensate and not live steam passes through the rings $c$ and $d$, air circulated thereover is not heated, providing about the hot air column a shell or envelope of cool air.

Fig. 4 illustrates the relative air column arrangement resulting from the tendency of the heated air to lose velocity after it has travelled a distance from the heater coils. The heated air is caught in the more accelerated surrounding shell of unheated air column and must be mixed therewith to form a uniformly heated air stream of a predetermined temperature which is the average of the heated and unheated air columns, depending on the relative magnitudes or thicknesses thereof.

In Fig. 7, I have illustrated the relative arrangement of the component parts of the air stream as it emerges past the heating coils of a device such as shown in Fig. 6, and which consists of a plurality of concentric, cylindrical, alternate heated and unheated air columns. In this air stream, as in that of Fig. 3, the central air column, passing through the opening of coil ring $e$, is also unheated.

The air passing over and immediately about the steam containing coil rings $e$ and $f$ of the upper heater coil is heated thereby to form a hot air column. The air passing over and about the coil rings $g$ and $h$ of the upper heater coil, which contain condensate, will remain unheated and provide an unheated air column about such heated air column.

Similarly, air passing over and about rings $kl$ of the lower heater, which contain steam, will form a heated air column, and since rings $k$ and $l$ are wider than rings $g$ and $h$, the heated air column formed over rings $k$ and $l$ will surround the unheated air column formed over rings $g$ and $h$.

Finally, air passing over coil rings $m$ and $n$, which are the widest, and contain condensate will be unheated and will form an enshrouding unheated air column about all of the other heated and unheated air columns.

Fig. 8 illustrates the effect of the concentrically arranged alternate heated and unheated air columns on the air stream at a distance from the heating device, showing the respective columns thoroughly mixed and intermingled into an air stream having a temperature which is the average of the temperatures of its component air columns.

It will be understood that the throttle or valve may be manually or thermostatically controlled. In the latter case, the throttle may be actuated, by a suitable thermostat, of the type commonly found in the art, and which, therefore, need not be described or illustrated. Such thermostat may be arranged in the air stream discharged from the device or in the room or space in which the device is disposed, depending on the temperature of which it is desired to control.

The steam circulating valve or throttle will, in such case, be actuated, under the influence of the thermostat, by any suitable means, such as an electric motor, vapor motor of the bellows type or an air motor. Such devices are well known for the purposes and need not be described and illustrated since knowledge of their detailed construction is not essential to an understanding of the invention.

While in the illustrative embodiments described, the steam is shown as travelling in a uniform direction through all of the heater coils of each device, it may here be stated that my invention is not to be so limited, as the various heater coils in each device may be so connected as to have the steam travel in opposed directions through the various coils.

It will be understood that the heating medium need not be steam, but may be water, oil or any other suitable fluid to obtain the novel results described and claimed.

While I have shown and described certain specific examples of my invention, it will be understood that such examples are illustrative and are not given as limitations, since other modifications within the sipirt and scope of the invention will be apparent to those skilled in the art. Hence, I do not intend to limit myself thereto, but intend to claim my invention as broadly as may be permitted by the state of the prior art and the terms of the appended claim.

I claim:

A unit heater comprising in combination a casing, air heating means arranged in the casing and comprising a plurality of expanding spiral steam conducting heating tubes adapted to be connected in parallel in a steam system, any spiral tube having its widest ring narrower than the narrowest ring of the next succeeding adjacent spiral tube, means for circulating a stream of air through the casing, spaced fins arranged on said tubes extending substantially in the direction of flow of the air stream, a steam inlet pipe connected to the air heating means, in parallel with the tubes at the centers of the spiral and means, in the inlet pipe for controlling the steam pressure within each heating tube.

HARRY STEWART WHELLER.